United States Patent

Legg

(10) Patent No.: US 8,085,657 B2
(45) Date of Patent: Dec. 27, 2011

(54) FLOW CONTROL IN A CELLULAR COMMUNICATION SYSTEM

(75) Inventor: Peter Jonathon Legg, Swindon (GB)

(73) Assignee: Sony Corporation, Tokyo (JP)

( * ) Notice: Subject to any disclaimer, the term of this patent is extended or adjusted under 35 U.S.C. 154(b) by 687 days.

(21) Appl. No.: 11/097,584

(22) Filed: Apr. 1, 2005

(65) Prior Publication Data

US 2006/0223585 A1 Oct. 5, 2006

(51) Int. Cl.
*G01R 31/08* (2006.01)
*H04B 1/56* (2006.01)
*H04M 1/00* (2006.01)

(52) U.S. Cl. ........ 370/229; 370/230; 370/232; 370/276; 455/560; 455/561

(58) Field of Classification Search ............. 370/231, 370/235, 229
See application file for complete search history.

(56) References Cited

U.S. PATENT DOCUMENTS

| | | | |
|---|---|---|---|
| 7,376,426 B2 * | 5/2008 | Nakamata et al. | 455/442 |
| 2002/0068588 A1 * | 6/2002 | Yoshida et al. | 455/461 |
| 2004/0013089 A1 * | 1/2004 | Taneja et al. | 370/235 |
| 2004/0027997 A1 | 2/2004 | Terry et al. | |
| 2004/0090916 A1 * | 5/2004 | Hosein | 370/235 |
| 2004/0193719 A1 | 9/2004 | Yang et al. | |
| 2004/0258090 A1 * | 12/2004 | Sharafeddine et al. | 370/468 |
| 2005/0239435 A1 | 10/2005 | Ikeda et al. | |
| 2006/0050723 A1 * | 3/2006 | Yu | 370/412 |
| 2006/0067229 A1 * | 3/2006 | Frederiksen | 370/235 |
| 2006/0114936 A1 * | 6/2006 | Paffen | 370/469 |
| 2006/0176866 A1 * | 8/2006 | Wakabayashi | 370/342 |
| 2006/0203760 A1 * | 9/2006 | Fukui et al. | 370/328 |
| 2007/0081498 A1 * | 4/2007 | Niwano | 370/335 |
| 2007/0140123 A1 * | 6/2007 | Fukui | 370/235 |

FOREIGN PATENT DOCUMENTS

EP 1523134 A1 4/2005
WO WO-2004/089027 A1 10/2004

OTHER PUBLICATIONS

Holma, H. ed. (2001) *WCDMA for UMTS*, Wiley & Sons, ISBN-0471486876.
Mouly, M., et al. (1992) *The GSM System for-Mobile Communications*, Bay Foreign Language Books, ISBN-2950719007. "Universal Mobile Telecommunications System (UMTS); UTRAN Iub Interface User Plane Protocols for CCH Data Streams (3GPP TS 25.435 version 6.1.0 Release 6)," (Mar. 2004). ETSI TS 125 435 v6.1.0:1-46.
Chen, Y.-C. et al. (2004). "An Adaptive Buffer Allocation Mechanism for Token Bucket Flow Control," *IEEE*, pp. 3020-3024.
International Search Report and Written Opinion mailed May 15, 2006, for PCT Application No. PCT/EP2006/050805 filed Feb. 9, 2006, 14 pages.

* cited by examiner

*Primary Examiner* — Huy Vu
*Assistant Examiner* — Brandon Renner
(74) *Attorney, Agent, or Firm* — Oblon, Spivak, McClelland, Maier & Neustadt, L.L.P.

(57) ABSTRACT

A base station comprises an RNC message receiver which receives data packets from a Radio Network Controller, RNC. The data packets are transmitted over air interface channels by a transmitter. The base station includes buffer memory for buffering the data packets prior to transmission, a scheduler for scheduling the data packets for transmission over the air interface channels, and a memory allocator for determining a first memory allocation of the buffer memory for a first air interface communication with a first user equipment. The base station further includes a flow controller for determining a transfer allowance for transferring of data from the RNC to the base station in response to the first memory allocation and a current buffer memory usage of the first air interface communication. The transfer allowance is transmitted to the RNC by an RNC message transmitter for achieving an efficient flow control.

37 Claims, 7 Drawing Sheets

FLOW CONTROL IN A CELLULAR COMMUNICATION SYSTEM

FIELD OF THE INVENTION

The invention relates to flow control in a cellular communication system and in particular to flow control between a Radio Network Controller and a base station.

BACKGROUND OF THE INVENTION

In a cellular communication system, a geographical region is divided into a number of cells each of which is served by a base station. The base stations are interconnected by a fixed network which can communicate data between the base stations. A mobile station is served via a radio communication link by the base station of the cell within which the mobile station is situated. Communication from a mobile station to a base station is known as uplink, and communication from a base station to a mobile station is known as downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the $2^{nd}$ generation cellular communication system known as the Global System for Mobile communication (GSM). Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) and Frequency Division Duplex (FDD) or Time Division Duplex (TDD). In CDMA systems, user separation is obtained by allocating different spreading and scrambling codes to different users on the same carrier frequency and in the same time intervals. In TDD, user separation is achieved by assigning different time slots to different uses in a similar way to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a UMTS CDMA communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN comprises the base stations, which in UMTS are known as Node Bs, as well as Radio Network Controllers (RNC) which control the Node Bs and the communication over the air interface.

The specifications for UMTS and other $3^{rd}$ generation cellular communication systems are being standardised in Technical Specifications by the $3^{rd}$ Generation Partnership Project (3GPP). In order to improve the performance, operation and service provided by UMTS, the Technical Specifications are continuously being updated. For example, in Release 5 of the 3GPP specifications, a new service known as High Speed Downlink Packet Access (HSDPA) has been introduced to offer greater downlink packet throughputs than earlier releases that are reliant upon dedicated or downlink shared channels.

A significantly more efficient and flexible downlink packet data communication is achieved by HSDPA. This is achieved by a combination of features including the introduction of link adaptation in the form of adaptive modulation and coding, the use of incremental redundancy retransmission schemes and a more efficient data scheduling functionality. In particular, the HSDPA architecture splits the Medium Access Control (MAC) layer between the RNC and the base station such that some scheduling of data packets is performed at the base station. The scheduling at the base station allows a much faster scheduling which may take into account the varying propagation conditions for individual mobile stations thereby allowing a more efficient utilisation of the limited air interface resource.

Specifically, the RNC generates data packets known as MAC PDUs (Packet Data Unit) which are aggregated and sent to the base station over the interconnection between these (known as the Iub interface) The base stations buffer the PDUs until they are scheduled by the base station scheduler and successfully transmitted over the air interface to a mobile station.

It is clear that in order for such a distributed scheduling operation to function effectively, the control of data transmissions over the Iub must be very efficient. It is thus of the utmost importance that the flow control between the RNC and the base station is efficient and reliable.

In accordance with the Technical Specifications, the base station is the master of the flow control and controls the data exchange. Specifically, the Technical Specifications define a number of data messages that may be used for the flow control. For example, the RNC can request additional buffer space at the base station by transmitting an HS-DSCH CAPACITY REQUEST message. In response, the base station may choose to grant resource using an HS-DSCH CAPACITY ALLOCATION message. This message provides a variety of data that may be used to control the flows.

The grant replaces any existing credits, and may be unsolicited (i.e. it does not have to follow a request from the RNC).

Furthermore, the Node B can make an initial allocation of credits (Initial Window Size) to the RNC when the radio link to the UE is configured.

Furthermore, the HS-DSCH Data Frame used by the RNC to communicate PDUs also comprises a field called User Buffer Size (UBS) which indicates the RNC buffer size for pending PDUs, i.e. the number of PDUs which are pending at the RNC for a given communication.

The Technical Specifications do not define a specific flow control algorithm that must be adopted but rather provides a number of messages that may be used by individual manufacturers to implement their preferred flow control algorithm.

It will be appreciated that the performance of such a flow control algorithm is crucial to the performance of the HSDPA service.

Specifically, a flow control algorithm should try to optimise at least the following characteristics:

A minimisation of latency:

Data should not be held at the RNC if there is a possibility of it being scheduled by the base station. In particular, "stalling"should be avoided. Stalling occurs when a communication is scheduled and all its PDUs at the base station are transmitted, but more would have been transmitted if the flow control had delivered additional PDUs from the RNC to the base station.

A minimisation of the number of PDUs buffered at the base station.

When the mobile station undertakes a handover to a new base station, any PDUs buffered at the current base station are simply discarded. The impact of this on RLC AM (Acknowledged Mode—using retransmissions of lost data packets) radio bearers is one of increased latency—the RLC protocol can recover the loss using retransmissions but this introduces a substantial delay. However, for UM (Unacknowledged Mode—no retransmissions) radio bearers the data is unrecoverably lost.

In certain implementations, base station buffer memory may be a limited resource.

A minimisation of flow control signalling.

The bandwidth of flow control signalling on the Iub should be acceptable in order to maintain low cost and high throughput.

However, these requirements tend to be conflicting requirements and a trade off between the requirements is typically required. However, known algorithms tend to be suboptimal and to provide performance and/or trade offs which are undesirable.

Hence, an improved flow control would be advantageous and in particular a system allowing for increased flexibility, low complexity implementation, improved performance, reduced latency, reduced storage of packet data at the base station, reduced signalling overhead and/or improved trade off between conflicting requirements would be advantageous.

SUMMARY OF THE INVENTION

Accordingly, the invention seeks to preferably mitigate, alleviate or eliminate one or more of the above mentioned disadvantages singly or in any combination.

According to a first aspect of the invention there is provided a base station for a cellular communication system, the base station comprising; means for receiving data packets from a Radio Network Controller, RNC; means for transmitting the data packets over air interface channels; buffer memory for buffering the data packets prior to transmission; scheduling means for scheduling the data packets for transmission over the air interface channels; memory allocation means for determining a first memory allocation of the buffer memory for a first air interface communication with a first user equipment; flow control means for determining a transfer allowance for transferring of data from the RNC to the base station in response to the first memory allocation and a current buffer memory usage of the first air interface communication; and communication means for transmitting the transfer allowance to the RNC.

The invention may allow highly effective flow control for a data flow between the RNC and the base station. The flow control may e.g. allow reduced latency, reduced buffer underflow/overflow, low signalling overhead and/or a simplified implementation. The performance of the cellular communication system as a whole may be improved and/or the service provided to users may be improved. In particular, the invention may allow a highly efficient flow control for a shared scheduling function between the base station and the RNC.

The invention may allow an improved trade off between latency, buffer memory usage and/or signalling complexity.

The first air interface communication may be a communication using a shared communication channel. The cellular communication system may be a UMTS cellular communication system and the first air interface communication may in particular be a communication of an HSDPA service. The buffer memory may be a buffer memory which is common to a plurality of communications using a shared communication channel.

The transfer allowance may e.g. in a UMTS application be in the form of communication credits. The transfer allowance may be associated with a time interval in which the transfer allowance is valid. The transfer allowance may be an RNC to base station data transfer allowance that may indicate an allocation of data that may be transferred from the RNC to the base station.

According to an optional feature of the invention, the flow control means is arranged to determine the transfer allowance as the first memory allocation minus the current buffer memory usage. This provides for an easy to implement yet effective determination of the transfer allowance.

According to an optional feature of the invention, the flow control means is arranged to determine the transfer allowance in response to a scheduling of data packets from the buffer memory by the scheduling means.

This may allow an effective flow control wherein the transfer allowance may accurately reflect the dynamic changes of the base station and may in particular allow the data transfer from the RNC to be matched to the transmission of data packets to the user equipments. For example, as data packets are scheduled from the buffer memory of the base station, the transfer allowance may be increased to reflect that there is additional resource within the first memory allocation.

The value of the transfer allowance may for example be determined in response to the scheduling and/or the determination of the transfer allowance may be instigated by the scheduling of data packets.

According to an optional feature of the invention, the memory allocation means is arranged to determine the first memory allocation in response to a transfer allowance request from the RNC. This may provide for an efficient flow control and may allow a dynamic adaptation of the flow to suit the requirements of both the base station and of the RNC.

According to an optional feature of the invention, the memory allocation means is arranged to determine the first memory allocation in response to an RNC buffer usage indication for data packets associated with the first air interface communication.

This may provide an efficient flow control resulting in a high performance of the communication system as whole. The RNC buffer usage indication may be an indication of a number of data packets which are stored at the RNC ready for transmission to the user equipment of the first air interface communication. For example, for a UMTS application, the RNC buffer usage indication may be a User Buffer Size (UBS) parameter transmitted in e.g. a HS-DSCH CAPACITY REQUEST message.

According to an optional feature of the invention, the memory allocation means is arranged to increase the first memory allocation if the sum of the current buffer usage and a buffer memory usage associated with RNC buffer usage indication exceeds the first memory allocation.

This may allow a flexible and highly efficient arrangement wherein buffer memory usage may be dynamically adapted to match the current requirements. The dynamic and flexible memory allocation may take into account characteristics of the base station as well as the RNC thereby providing for an efficient flow control adapted to both current and future scheduling and storage characteristics of the base station.

The increase of the first memory allocation may for example be subject to a maximum threshold for the communication and/or to the availability of unallocated memory in the buffer memory.

The increase may for example be by an iterated doubling of the first memory allocation until this exceeds the sum of the current buffer usage and a buffer memory usage associated with RNC buffer usage indication.

The RNC buffer usage indication may directly be expressed in data packets or may be converted prior to evaluation of the relation.

According to an optional feature of the invention, the base station comprises means for determining the transfer allowance in response to an amount of data packets received from the RNC. This may allow efficient flow control.

The determination may be in response to a previous transfer allowance such as the transfer allowance which was most recently transmitted to the RNC. The transfer allowance may specifically be reduced by the number of data packets which have been received from the RNC since the transmission of the last transfer allowance to the RNC.

According to an optional feature of the invention, the base station comprises means for determining a free buffer memory amount of the first memory allocation of the buffer memory.

This may improve performance and allow an improved flow control. The free buffer memory amount may be an amount of memory of the first memory allocation which is not currently reserved by a previously transmitted transfer allowance and is not currently used for buffering data for transmission over the air interface.

According to an optional feature of the invention, the means for determining the free buffer memory amount is arranged to determine the free buffer memory amount in response to a scheduling of data packets by the scheduling means. This may provide advantageous performance and may in particular allow a flow control which accurately adapts to the current characteristics. As data packets are scheduled and transmitted, the memory previously used to buffer these may be allocated as free memory.

According to an optional feature of the invention, the communication means is arranged to transmit the transfer allowance to the RNC only if the free buffer memory amount exceeds a transmission threshold. This provides for a highly efficient yet simple to implement means of controlling when to transmit the transfer allowance. In particular, it may allow an efficient trade of between signalling overhead and flow control performance.

According to an optional feature of the invention, the transmission threshold is a function of the first memory allocation. This may allow an efficient flow control and a practical control of the signalling overhead. The threshold may for example be determined by multiplying the first memory allocation by a coefficient having a value less than unity. The coefficient value may be selected to provide the desired trade-off between signalling overhead and dynamic performance.

According to an optional feature of the invention, a sum of the free buffer memory amount, the allocated transfer allowance and the current buffer memory usage is equal to the first memory allocation. The base station may determine the values such that this relationship holds. This may allow a high performance yet easy to implement flow control.

According to an optional feature of the invention, the memory allocation means comprises a maximum memory allocation threshold for the first memory allocation.

The first memory allocation may not exceed the maximum memory allocation threshold. This may improve performance and may allow the memory resource usage associated with the first air interface communication to be kept low while allowing an efficient throughput with low latency.

According to an optional feature of the invention, the maximum memory allocation threshold is dependent on a maximum scheduling capacity of the scheduling means in one scheduling interval. This may improve performance and may allow the memory resource usage associated with the first air interface communication to be kept low while allowing an efficient throughput with low latency.

According to an optional feature of the invention, the maximum memory allocation threshold is dependent on a latency characteristic of the communication between the RNC and the base station. This may improve performance and may allow the memory resource usage associated with the first air interface communication to be kept low while allowing an efficient throughput with low latency.

According to an optional feature of the invention, the memory allocation means is arranged to determine the first memory allocation for a first priority level of the first user equipment. The first memory allocation may be associated with a priority level associated with a user equipment rather than with an individual communication or communication channel. This may allow improved performance, an efficient flow control and/or improved compatibility with existing systems such as UMTS.

According to an optional feature of the invention, the first priority level is associated with a plurality of air interface channels between the base station and the first user equipment.

This may allow efficient scheduling and/or efficient flow control. Alternatively or additionally it may allow compatibility with existing communication systems such as UMTS. For example, the priority level may be a given Scheduling Priority Indicator (SPI) used in UMTS to specify the relative priority of PDUs stored at the base station prior to transmission. The SPI represents the relative priority for logical channels of one user equipment, but also between different user equipments (i.e. it is a global priority).

The first memory allocation may be common for a plurality of communications associated with the user equipment of the first air interface communication. The first memory allocation may be associated with a given priority level rather than an individual communication or communication channel.

According to an optional feature of the invention, the base station claimed further comprises means for initialising the first memory allocation to a predetermined value at initialisation of the first air interface communication. This allows for an efficient flow control and in particular an efficient initialisation of the flow control algorithm for a new communication.

According to an optional feature of the invention, the base station further comprises means for initialising the transfer allowance to a predetermined value at initialisation of the first air interface communication. This allows an efficient flow control and in particular an efficient initialisation of the flow control algorithm for a new communication. The transfer allowance may specifically be set equal to the predetermined value for the first memory allocation.

According to an optional feature of the invention, the base station further comprises means for initialising the current buffer memory usage to a predetermined value at initialisation of the first air interface communication. This allows an efficient flow control and in particular an efficient initialisation of the flow control algorithm for a new communication. The current buffer memory usage may specifically be set equal to zero.

According to an optional feature of the invention, the transfer allowance is indicative of a number of data packets associated with the first air interface communication that may be transmitted to the base station from the RNC. This may facilitate implementation.

According to an optional feature of the invention, the memory allocation means is arranged to determine a memory allocation of the buffer memory for each of a plurality of air interface communications. The plurality of air interface communications may be equal to one or more user equipments.

According to an optional feature of the invention, the base station further comprises means for determining an expiration time of a transfer allowance and for transmitting a new transfer allocation to the RNC in response to the expiration time. This may improve performance and may in particular reduce latency.

According to an aspect of the invention, there is provided a cellular communication system comprising a base station as previously described.

According to an optional feature of the invention, the RNC comprises: means for receiving the transfer allowance; and means for transmitting data packets for the first communication to the base station in response to the transfer allowance. This may allow a practical implementation and/or efficient flow control.

According to an optional feature of the invention, the RNC further comprises means for generating a transfer allowance request in response to a determination that a current transfer allowance is insufficient to transmit all data packets for the first air interface communication which are pending at the RNC. This may allow a practical implementation and/or efficient flow control.

According to an optional feature of the invention, the RNC further comprises means for replacing an existing transfer allowance when a transfer allowance is received from the base station. This may allow a practical implementation and/or efficient flow control. The feature may furthermore provide compatibility with existing systems such as UMTS. In particular, when a new transfer allowance is received the current allowance may be overwritten by the new value.

According to a different aspect of the invention, there is provided a method of flow control for a cellular communication system, the method comprising a base station: receiving data packets from a Radio Network Controller, RNC; transmitting the data packets over air interface channels; buffering in buffer memory the data packets prior to transmission; scheduling the data packets for transmission over the air interface channels; determining a first memory allocation of the buffer memory for a first air interface communication with a first user equipment; determining a transfer allowance for transferring of data from the RNC to the base station in response to the first memory allocation and a current buffer memory usage of the first air interface communication; and transmitting the transfer allowance to the RNC.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF EMBODIMENTS OF THE INVENTION

The following description focuses on embodiments of the invention applicable to a UMTS cellular communication system and in particular to HSDPA communication in a cellular communication system. However, it will be appreciated that the invention is not limited to this application but may be applied to many other communication systems and services.

Figure 1:
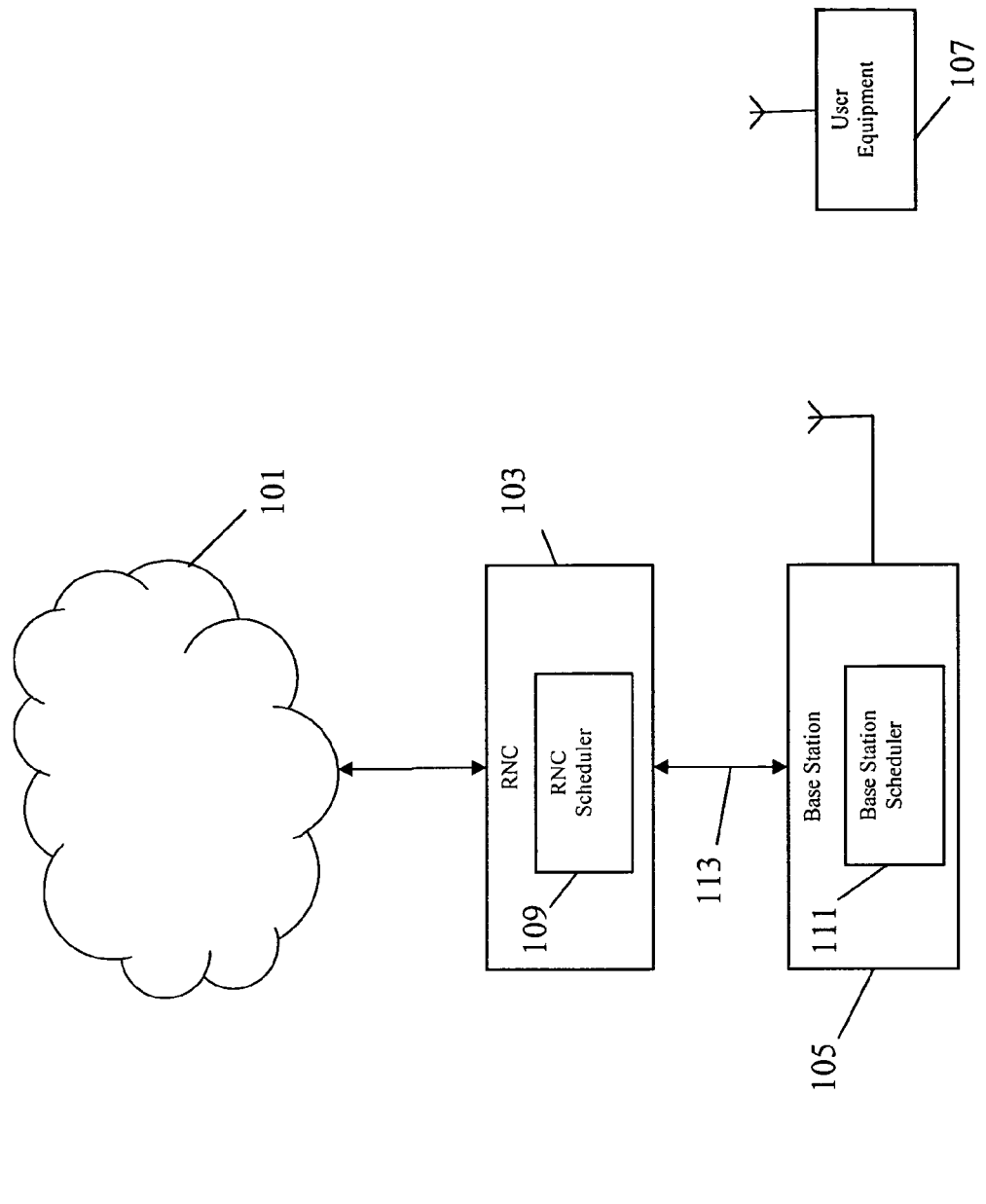
FIG. 1 illustrates an example of a cellular communication system in accordance with some embodiments of the invention.

FIG. 1 illustrates an example of a cellular communication system 100 in accordance with some embodiments of the invention. The cellular communication system 100 is particularly a UMTS cellular communication system supporting HSDPA services. The UMTS system 100 comprises a core network 101 which is coupled to a number of RNCs of which one RNC 103 is shown. The RNC 103 is coupled to a number of base stations of which one base station 105 is shown. The base station 105 supports an HSDPA service for a first user equipment 107. It will be appreciated that the base station 105 typically will support a large number of user equipments simultaneously.

In the example, the scheduling of data packets over a shared HS-DSCH (High Speed-Downlink Shared CHannel) communication channel is split between the RNC 103 and the base station 105. Thus, the RNC comprises a first scheduler 109 and the base station 105 comprises a second scheduler 111 for the HSDPA service.

Hence, the RNC scheduler 109 generates MAC-d PDUs (Packet Data Units) which are aggregated and sent to the base station 105 over the connection between the RNC 103 and the base station 105, known as the Iub interface 113. The RNC 193 furthermore comprises buffer memory (not shown) for storing MAC-d PDUs prior to transmitting them to the base station 105. Thus, when the RNC 103 receives data from the core network 101 for transmission to the user equipment 107 over the HS-DSCH communication channel, it generates a corresponding number of PDUs and stores them in the buffer memory ready for transmission to the base station 105.

The base station 105 is responsible for the transmission over the air interface channels and specifically is responsible for scheduling and transmitting the data packets over the HS-DSCH to the user equipment 107. The base station scheduler 111 schedules PDUs over the HS-DSCH in response to the individual propagation conditions of the individual user equipments as will be known to the person skilled in the art.

Clearly, in such an arrangement it is essential that the data flow between the RNC 103 and the base station 105 is highly efficient. Accordingly, the flow control for the data flow over the Iub interface 113 is one of the most critical parameters of an HSDPA system. However, the UMTS Technical Specifications do not define how this flow control must be performed but merely defines a number of messages and parameters that may be used for controlling the flow.

Figure 2:
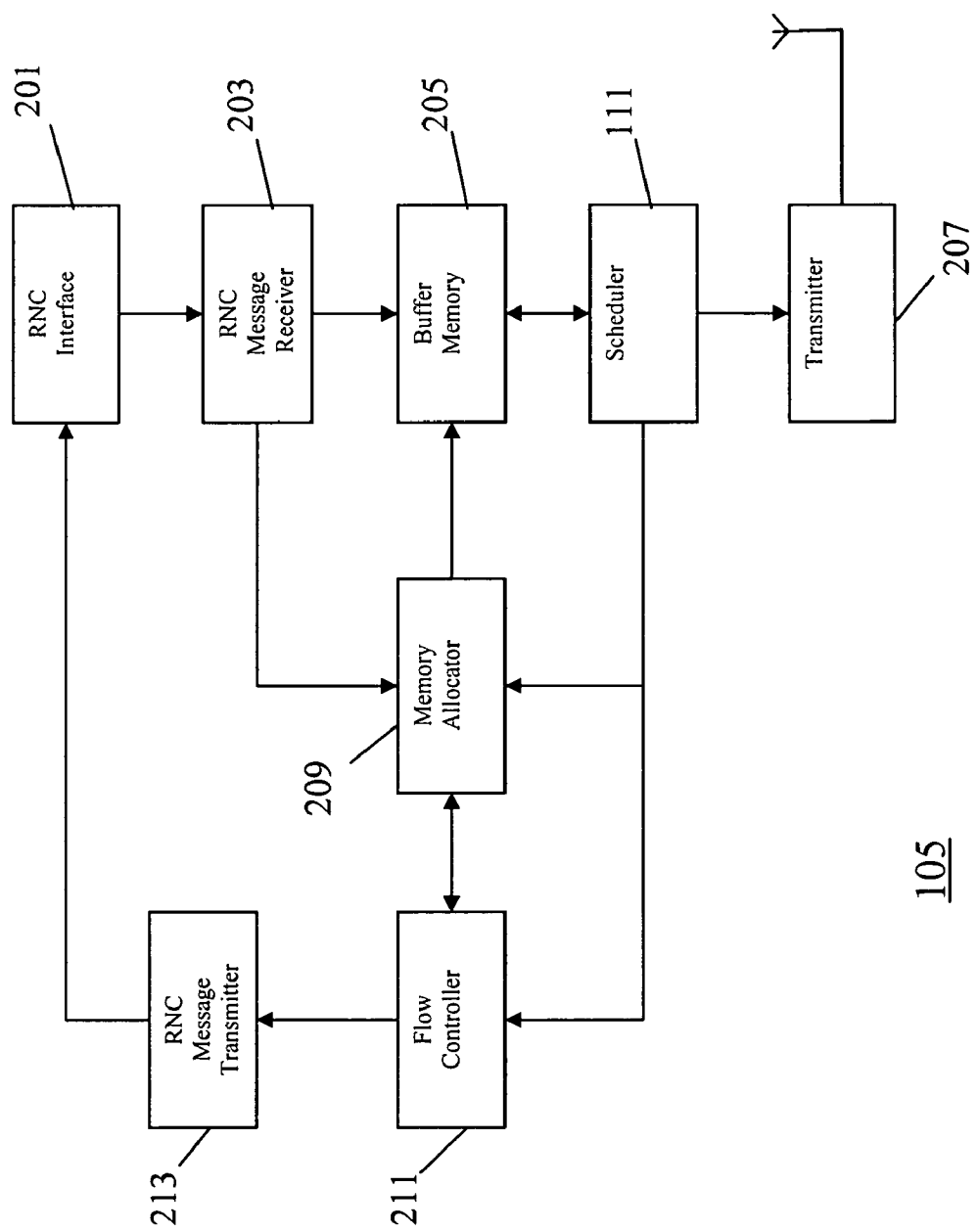
FIG. 2 illustrates an example of a base station in accordance with some embodiments of the invention.

FIG. 2 illustrates the base station 105 of FIG. 1 in more detail. The base station 105 comprises an RNC interface 201 which is operable to exchange data and signalling with the RNC 103 in accordance with the Technical Specifications for the Iub interface 113.

The RNC interface 201 is coupled to an RNC message receiver 203 to which the RNC interface 201 forwards data and signalling messages received from the RNC 103. The RNC message receiver 203 is further coupled to a buffer memory 205 which is used for buffering the received data packets prior to transmission over the air interface. Thus, when the RNC message receiver 203 receives PDUs from the RNC 103, these are stored in the buffer memory 205 until scheduled and transmitted over the HS-DSCH link.

Accordingly, the buffer memory 205 is coupled to the base station scheduler 111 which schedules the data packets for transmission over the air interface HS-DSCH channels. The scheduler 111 is coupled to a transmitter 207 which transmits the data packets over the air interface in accordance with the specifications and requirements for a UMTS cellular communication system.

The base station 105 furthermore comprises functionality for controlling the flow over the Iub interface 113. Specifically, the base station 105 allows for a highly efficient flow control with flexible control and optimisation of the trade off between conflicting requirements such as low buffering at the base station, low latency and a low signalling overhead. Furthermore, this may be achieved while utilising the standard messages defined in the UMTS Technical Specifications.

The base station 105 comprises a memory allocator 209 which controls the memory allocation of the buffer memory 205 to different communications. In particular, the base station 105 may support a plurality of communications to different user equipments over the shared channel and the memory allocator 209 may allocate a certain memory allocation to each user equipment. Thus, the memory allocator 209 may effectively control the sharing of the buffer memory 205. Specifically, the memory allocator 209 may determine a first memory allocation of the buffer memory 205 for the communication with the user equipment 107 over the HS-DSCH.

The base station furthermore comprises a flow controller 211 which is capable of controlling the data flow from the RNC 103 to the base station 105. The flow controller 211 is capable of controlling the data flow by transmitting signalling messages to the RNC 103 and these signalling messages may in particular be standard UMTS signalling messages as defined in Release 5 of the UMTS Technical Specifications.

Accordingly, the flow controller 211 is coupled to an RNC message transmitter 213 which is arranged to generate the required messages and to transmit them to the RNC 103 through the RNC interface 201.

The flow controller 211 is furthermore coupled to the memory allocator 209 and receives information of the first memory allocation therefrom. In addition, the flow controller 211 is coupled to the scheduler 111 and receives information of the current buffer memory usage for the first user equipment 107. The flow controller 211 uses this information to determine a transfer allowance for transferring of data from the RNC to the base station. In particular, the flow controller 211 may determine the transfer allowance as the first memory allocation minus the current buffer memory usage. The transfer allowance is an indication of the amount of data that the RNC 103 may freely transmit to the base station 105 without needing to request prior approval.

Specifically, the transfer allowance may be determined as a number of PDUs that can be transmitted by the RNC 103 to the base station 107. The transfer allowance may be transmitted to the RNC 103 and in response the RNC 103 limits the transmission of PDUs to the allocated transfer allowance. As a specific example, the base station 105 may transmit a transfer allowance of 20 PDUs (conveniently referred to as credits) to the RNC 103. In response, whenever the RNC 103 generates PDUs for transmission to the first user equipment 107 it will determine the current transfer allowance and immediately transmit PDUs up to this limit. If the number of PDUs is lower than the current allowance, the transfer allowance is reduced by the number of transmitted PDUs. If the number of PDUs to be transmitted is higher than the current allowance, a number of PDUs up to the current-allowance is transmitted immediately and the remaining PDUs are stored in the RNC buffer awaiting a new transfer allowance from the base station.

As will be described in the following, the flow controller 211 may dynamically determine a suitable transfer allowance in response to the operations and characteristics at the base station (such as the transmission of data packets, the available buffer memory etc) and may transmit new transfer allowances to the RNC 103 at suitable time intervals. The base station 105 may thereby effectively control the data flow over the Iub interface 113 and may provide an efficient performance with low latency, low buffer memory requirements and a low signalling overhead.

It will be appreciated that the individual functional units of FIG. 2 may be implemented in one or more processors. For example, the operation of the memory allocator 209, the flow controller 211 and possibly the RNC message transmitter and RNC message receiver may be implemented as one or more software or firmware routines running on a single computational platform such as on a single signal processor.

Figure 3:
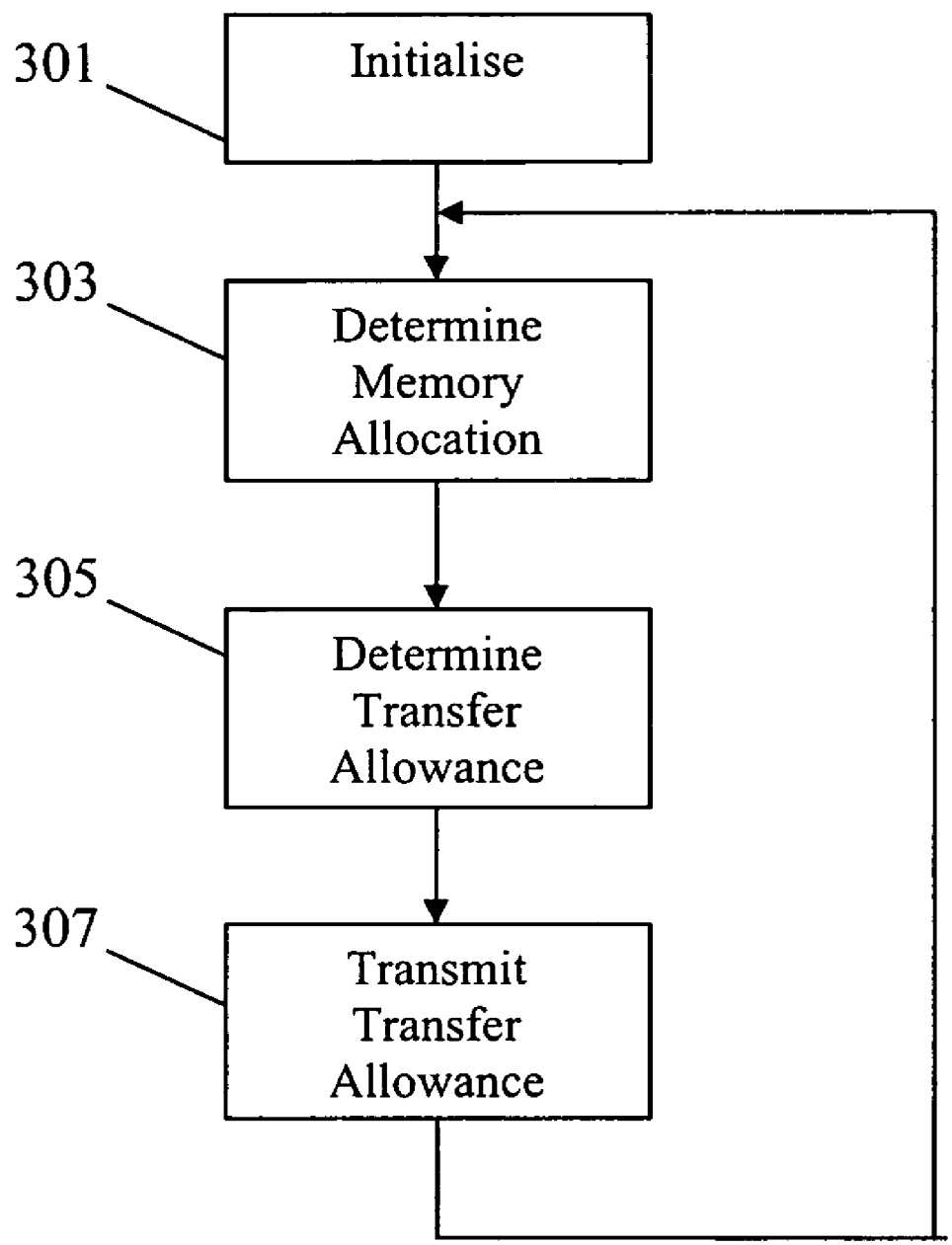
FIG. 3 illustrates a flow chart of a method of flow control in accordance with some embodiments of the invention.

FIG. 3 illustrates a flow chart of a method of flow control in accordance with some embodiments of the invention. In particular, the method may be performed by the base station 105 of FIG. 1 and will be described with reference to this.

In the specific embodiment, the flow control is for a UMTS HSDPA service. Furthermore, in the example, memory allocation and flow control is performed for individual priority levels for each user equipment. In particular, in UMTS, HSDPA communications to user equipments may be assigned a priority level in the form of a Scheduling Priority Indicator (SPI) which is a four bit value specifying the relative priority of the PDUs at the base station. SPI is also known as Common transport CHannel-Priority (CmCH-PI). In the example of FIG. 3, the flow control is controlled individually for each CmCH-PI of each user equipment.

Each priority level may be associated with (e.g. used by) a plurality of data services, applications, air interface services and/or air interface links.

The method of FIG. 3 is initialised in step 301. This initialisation comprises determining initial values for parameters used in the determination of the transfer allowance as will be described later.

In addition, the initialisation comprises a determination of a maximum memory allocation threshold. The maximum memory allocation threshold is a threshold below which the first memory allocation for the user equipment 107 must be kept by the memory allocator 209. The maximum memory allocation threshold is thus an upper bound for the memory allocation for the communication to the user equipment 107 and is in the specific embodiment given by:

$$M\_max_{UE,CmCH-PI} = K \times max\ bits/MAC\text{-}d\ PDU\ size_{UE,CmCH-PI}$$

where K is an integer, and max bits is the maximum number of bits which can be scheduled for a single priority level in a single run of the base station scheduler 111. The maximum memory allocation threshold is thus determined for each individual CmCH-PI of the user equipment 107 and is determined as a maximum number of PDUs that may be allocated to that CmCH-PI in the buffer memory 205.

The maximum memory allocation threshold is determined such that the memory allocation is sufficient to compensate for the delays of the communication between the base station 105 and the RNC 103. In the example of a UMTS TDD system, the base station scheduler 111 executes every radio frame (10 ms) for a 3.84 Mcps TDD mode HSDPA cell. If the Iub interface had a latency of a few ms, then K could be set to one. The RNC scheduler 109 would in this case be able to serve the base station scheduler 111 with max bits every scheduling run for the specific CmCH-PI of the user equipment 107. In other words, the flow control would have enough time to draw another max bits to the base station 105 in time for the next scheduling 10 ms later, thus preventing stalling, whilst maintaining that a minimum number of bits would need to be stored at the base station 105. However, in a typical system the Iub latency is in the order of approximately 20 ms in each direction and K is preferably selected substantially higher. Typically, a value of around five is required to prevent stalling when the base station scheduler 111 schedules the maximum number of bits for the CmCH-PI of the user equipment 107 in consecutive scheduling runs.

Thus, in the described embodiment, the maximum memory allocation threshold is dependent on both a maximum scheduling capacity of the scheduling means in one scheduling interval and on a latency characteristic of the communication between the RNC and the base station.

Step 301 is followed by step 303 wherein the memory allocator 209 determines a first memory allocation for the specific CmCH-PI of the user equipment 107. At initialisation of the method, the first memory allocation may simply be set to a predetermined value such as for example to 20 PDUs.

Step 303 is followed by step 305 wherein the transfer allowance for the RNC 103 is determined. The base station 105 uses a number of parameters for each CmCH-PI of each user equipment to determine the transfer allowance.

In particular, the flow controller 211 uses the following parameters for each CmCH-PI of each user equipment:
M_tot:

The current maximum number of PDUs that may be buffered at the base station for the CmCH-PI of the user equipment 107. Thus, in the example M_tot is equal to the first memory allocation as determined by the memory allocator 209. M_tot is upper bounded by M_max.
M_used:

The number of PDUs which are buffered at the base station, i.e. the number of PDUs which are stored in the buffer memory 205.
M_alloc:

The number of PDUs which are allocated by the flow control process to the RNC 103 but which have not yet been used. Thus, M_alloc indicates base stations assumption of the remaining number of credits allocated to the RNC by previous transfer allowances.
M_free:

The number of PDUs which additionally could be allocated to the RNC 103 without exceeding M_tot and which have not previously been allocated or are used by currently stored PDUs.

The flow controller 211 maintains the following equality:

$$M\_tot = M\_used + M\_free + M\_alloc$$

Figure 4:
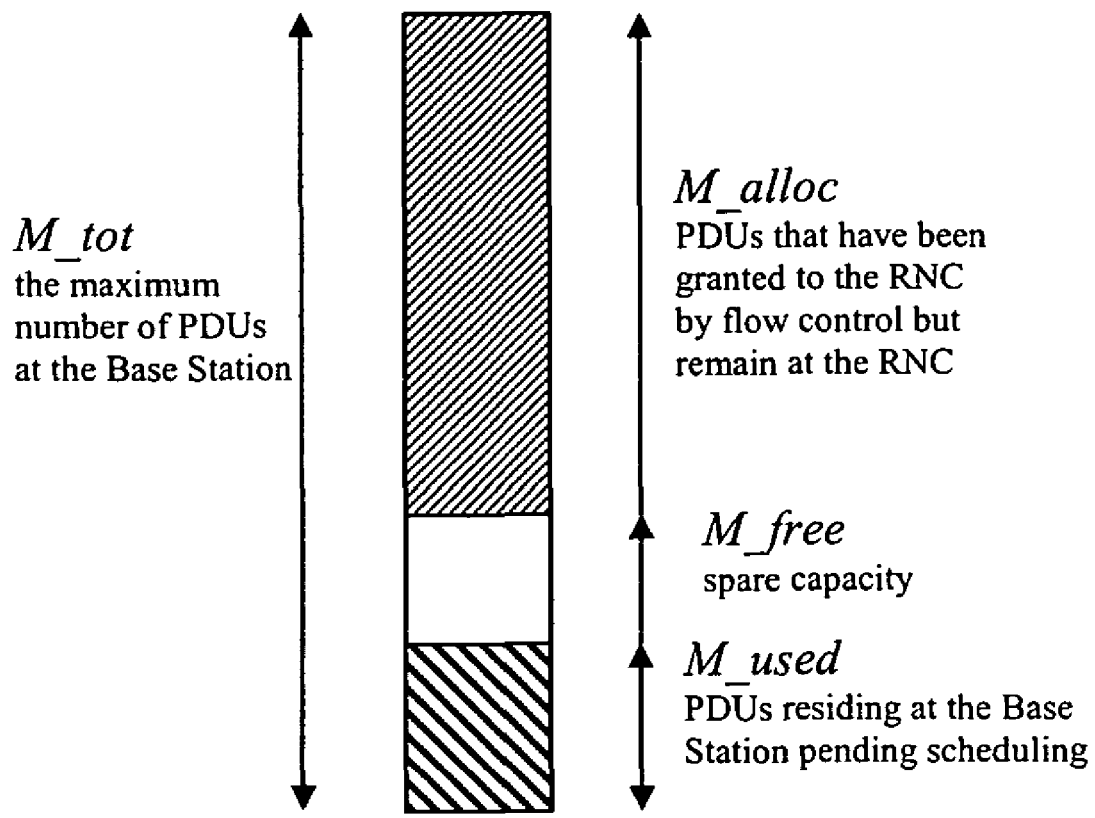
FIG. 4 illustrates an example of a relation between control flow parameters in accordance with some embodiments of the invention.

The relationship between the used parameters is illustrated in FIG. 4.

The base station 105 may initialise the parameters when the radio link is established and typically M_tot and M_alloc may be initialized to an Initial Window Size (i.e. an initial allocation of PDUs that the RNC 103 may transmit). The actual value will depend on the characteristics of the actual embodiment. In many embodiments, an initial value of M_tot and M_alloc may be 20 PDUs resulting in buffer memory for 20 PDUs being reserved in the buffer memory 205 and the RNC 103 being provided with a transfer allowance of 20 PDUs. The parameters M_free and M_used are typically set to zero.

In some embodiments, the initial value of the first memory allocation may furthermore be determined in response to information from the RNC of how many data packets are pending for transmission. For example, the RNC 103 may transmit a HS-DSCH Data Frame or a HS-DSCH CAPACITY REQUEST message comprising a UBS (User Buffer Size) indicating the number of PDUs pending at the RNC 103 for the specific CmCH-PI of the user equipment 107. The memory allocator 209 may proceed to increase the first memory allocation to accommodate this value, and may specifically repeatedly double M_tot until the total number of pending PDUs can be stored. This increase will be upper bounded by M_max and by the amount of memory available in the buffer memory 205 in view of the memory usage and allocation for other communications.

The flow controller 211 determines the transfer allowance as the number of additional PDUs which can be accommodated within the first memory allocation. Specifically, the flow controller 211 determines a number of credits (each credit corresponding to a transfer allowance of one PDU) which is determined by M_tot−M_used.

Furthermore, the flow controller 211 dynamically modifies the parameters to reflect the dynamic changes occurring at the base station 105 or the RNC 103.

For example, when the base station scheduler 111 schedules n PDUs, the flow controller 211 performs the following operations:

M_used is decremented by n reflecting that n PDUs have been retrieved from the buffer memory 205.

M_free is incremented by n reflecting that n previously used locations are now available within the first memory location. It should be noted that in some cases the latency of the Iub interface may result in M_used being temporarily higher than M_tot. In this case M_alloc is incremented by n.

As another example, if the base station 105 receives a data frame (HS-DSCH DATA FRAME) from the RNC 103 comprising m PDUs, the flow controller performs the following operation.

M_used is incremented by m and M_alloc is decremented by m reflecting that m PDUs have been stored in the buffer memory 205 and that the RNC 103 has used m credits from the previously allocated transfer allowance.

If the UBS field of the HS-DSCH DATA FRAME is above zero, this indicates that the RNC have further pending PDUs for the CmCH-PI of the user equipment 107. In this case, M_tot, reflecting the first memory allocation, is increased by the memory allocator 209. In the specific example, M_tot is doubled repeatedly until it exceeds the sum of the UBS (expressed in PDUs) and M_used. This results in the first memory allocation automatically being increased to a value whereby all PDUs pending at the RNC can be transferred to the base station 105. However, this increase is limited by the upper bound of M_max and the availability of memory in the buffer memory 205 in view of memory allocated to other CmCH-PIs and user equipments. If M_tot has increased, a new transfer allowance is determined reflecting this increased memory usage.

This approach may allow the memory allocation for individual CmCH-PIs of individual user equipments to automatically be adjusted to reflect the individual transfer requirements between the RNC 103 and the base station 105 for the CmCH-PI UE.

In embodiments where there is sufficient buffer memory, the first memory allocation may only be increased and there may not necessarily be any provision for reducing M_tot. Thus, in such embodiments, the memory allocation for a given user equipment CmCH-PI will be initialised to a low value and may dynamically and automatically be increased up to the upper bound of M_max. This memory allocation will then be maintained for the remainder of the call.

In other embodiments, a more efficient memory utilisation may be employed where M_tot may be both dynamically increased and decreased. As a simple example, if the base station 105 receives a HS-DSCH DATA FRAME with a UBS field of zero while M_alloc is higher than a threshold of, say 10 PDUs, M_tot may be set to the original initialisation value.

As another example of the operation of the flow controller 211, the base station 105 may receive a request for an increased transfer allowance from the RNC 103. In particular, the base station 105 may receive an HS-DSCH CAPACITY REQUEST and may in return perform the following operations:

If the sum of the UBS field (expressed in PDUs) and M_used exceeds M_tot this indicates that the current memory allocation is insufficient to buffer all pending PDUs. Accordingly, M_tot is increased subject to the upper bound and the availability of physical memory. This increase may for example be by a repeated doubling of M_tot until it exceeds the sum of UBS and M_used, the upper bound of M_max or the available memory of the buffer. The transfer allowance is then determined as the new M_tot minus M_used.

If the sum of the UBS field (expressed in PDUs) and M_used does not exceed M_tot, this indicates that the current memory allocation is sufficient to contain all pending PDUs. The transfer allowance is then determined as the current M_tot minus M_used.

Step 305 is followed by step 307 wherein a message comprising the transfer allowance is transmitted to the RNC 103. In some embodiments, a new message is always transmitted in step 307 whereas in other embodiments, the flow controller 211 may evaluate if a new message should be transmitted. Following step 307, the method iterates to step 303.

In the specific example of FIG. 3 the transfer allowance is always determined as the difference between M_tot and M_used (i.e. as by M_tot−M_used) and resulting value (in terms of a number of PDU credits) is transmitted to the RNC 103 in the UMTS HS-DSCH CAPACITY ALLOCATION message.

This message is quite a sophisticated message which allows the base station 105 to control:
  Allocation size: the number of PDUs and their maximum size (HS-DSCH Credits, Maximum PDU Length)
  The time interval over which the data can be sent (HS-DSCH Interval)
  The period over which this allocation is refreshed and repeated (HS-DSCH Repetition Period).

In the example the messages are transmitted using HS-DSCH Interval=2550 ms, and HS-DSCH Repetition Period=1 (implying no refresh of the credits at the end of the interval). In other embodiments, other values may be selected.

The grant of credits in a message replaces any existing credits at the RNC 103. Thus, when receiving a new transfer allowance, the RNC 103 overwrites any remaining transfer credits with the new value.

Accordingly, when a new UMTS HS-DSCH CAPACITY ALLOCATION message is transmitted, the RNC 103 is provided with a new transfer allowance (number of credits) resulting in the current transfer allowance simply being deleted thereby clearing any prehistory for the transfer allowance. The new transfer allowance corresponds to the difference between the current memory allocation for the CmCH-PI of the user equipment 107 and the current memory usage of the allocation in terms of the PDUs which are currently buffered at the base station 105. Furthermore, the memory allocation is dynamically modified in response to the requirements by the RNC 103 while taken into account the memory restrictions and sharing at the base station 105.

This may for example allow the RNC 103 to be automatically provided with sufficient credits to transfer all pending data packets if possible within the available memory and upper bounds. As another example, when the base station 105 schedules PDUs it may send an HS-DSCH CAPACITY ALLOCATION message to the RNC 103 such that the RNC 103 can top up the number of PDUs at the base station 105 without any explicit request or acknowledgement.

Furthermore, the flow control allows for a minimum of latency as PDUs may typically be sent straight from the RNC 103 to the base station 105 using available credits and without requiring any prior signalling between the RNC 103 and the base station 105.

The efficient flow control is furthermore achieved without a large signalling overhead. In some embodiments, the transmission of transfer allowances is furthermore controlled in response to the characteristics of the flow operation.

In particular, the UMTS HS-DSCH CAPACITY ALLOCATION message may only be transmitted to the RNC 103 if the free buffer memory amount exceeds a transmission threshold which may be determined as a function of the first memory allocation.

Specifically, only if M_free exceeds L×M_tot is an HS-DSCH CAPACITY ALLOCATION message generated and transmitted in step 307 (where L may be a constant between zero and one). L can be selected to manage the frequency of HS-DSCH CAPACITY ALLOCATION messages and may thus control the trade off between the frequency of updates and the signalling overhead.

The flow control is thus highly flexible and adaptable. For example, adjustment of the parameters K and L allows a simple yet effective control of the operation. E.g., to minimize stalling, K should just exceed the sum of the Iub latencies for the HS-DSCH Data Frame and the HS-DSCH CAPACITY ALLOCATION, and the scheduling interval (10 ms for 3.84 Mcps TDD mode), expressed in radio frames. L should be set to just below 1/K so that allocations are generated just in time to prevent stalling even if the CmCH-PI of the user equipment 107 is granted successive max bits allocations by the base station scheduler 111. If latency is not a prime concern, then it is possible to reduce K below the suggested value and this will reduce the quantity of data buffered at the base station 105 thereby improving the inter-base station handover performance. L can be increased, thereby reducing the frequency of allocation signalling, albeit with an increased risk of stalling.

The RNC 103 controls the data transmission such that PDUs are only transmitted to the base station 105 if the RNC 103 has a current transfer allowance. Furthermore, whenever PDUs are transmitted to the base station 105, the current transfer allowance is amended accordingly. As a specific example, if the current transfer allowance corresponds to 20 PDUs and the RNC 103 generates 10 PDUs for transmission to the user equipment 107, these 10 PDUs are transferred to the base station 105 and the transfer allowance is reduced to 10 PDUs. However, if the RNC 103 generates 40 PDUs for transmission to the user equipment 107, 20 of these are transferred to the base station 105, the transfer allowance is reduced to zero and the remaining 20 PDUs are buffered at the RNC 103.

Furthermore, if there are insufficient credits, the RNC 103 may set the UBS field to indicate a desired transfer allowance for all of these to be forwarded to the base station 105. Alternatively or additionally, the RNC may generate a transfer allowance request message requesting further credits, and in particular may transmit an HS-DSCH CAPACITY REQUEST to the base station 105. In response, the memory allocator 209 may seek to increase the first memory allocation to accommodate the requested number of PDUs.

In the specific example of FIG. 3, the HS-DSCH CAPACITY ALLOCATION messages are transmitted using HS-DSCH Interval=2550 ms, and HS-DSCH Repetition Period=1. This results in any remaining transfer allowance (credits) expiring after 2.55 secs. Thus, the RNC 103 operates timers which trigger a deletion of any remaining credits at the end of a given interval. This may cause a discrepancy between the number of credits at the RNC and the value of M_alloc.

Accordingly, in some embodiments, the base station 105 may comprise means for determining an expiration time of a transfer allowance. Furthermore, when the base station 105 determines that the transfer allowance expires, it may automatically transmit a new transfer allocation to the RNC 103. Specifically, the base station 105 may run a shadow timer which e.g. may expire just before the real timer of the RNC 103. Upon expiration of the shadow timer the base station may transmit an HS-DSCH CAPACITY ALLOCATION message with a transfer allowance of M_tot−M_used (if M_tot>M_used).

This will provide a latency gain when the RNC 103 has no PDUs, and none are generated for over 2.55 s. Otherwise, when PDUs are finally generated there are no credits remaining and the RNC 103 has to send a capacity request resulting in an increased delay.

Figure 5:
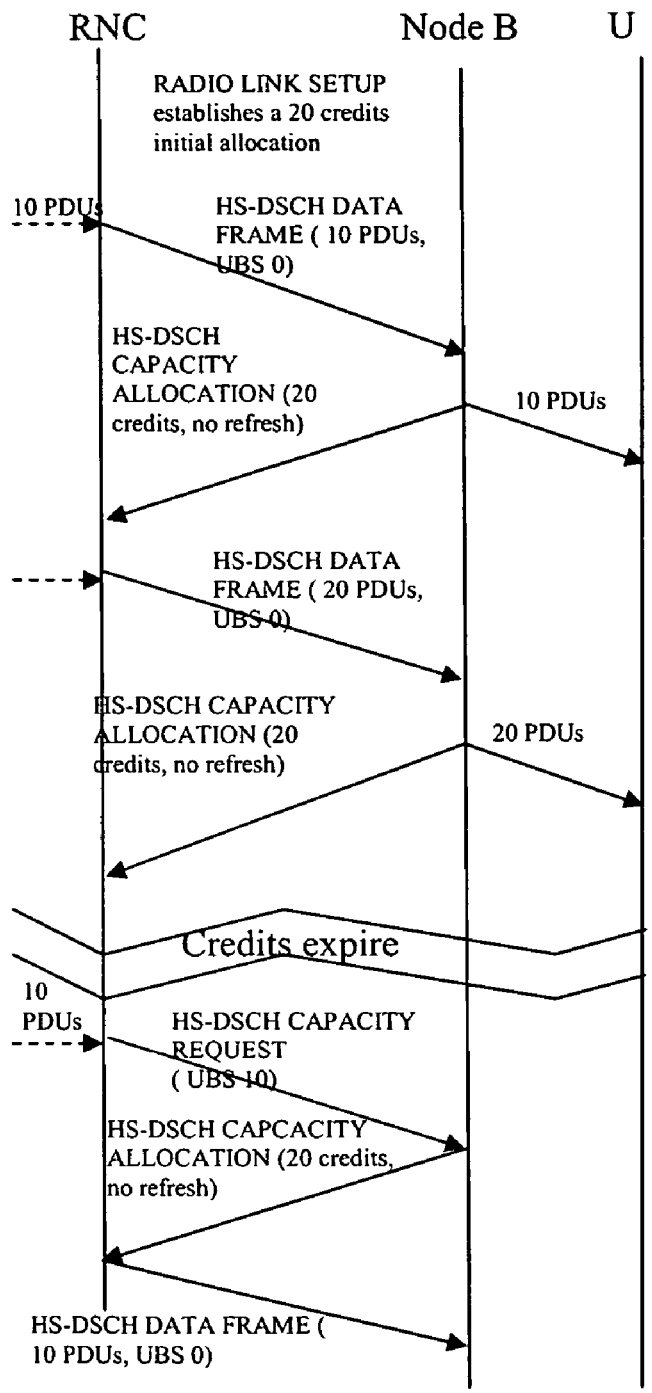
FIG. 5 illustrates an example data and signalling flow in accordance with some embodiments of the invention.

FIG. 5 illustrates an example flow chart in accordance with some embodiments of the invention. In the example, the RNC 103 is initially granted 20 credits (M_used=M_free=0, M_tot=M_alloc=20). When 10 PDUs are generated at the RNC 103, it immediately sends them to the base station 105. At the base station 105, M_used is increased to 10, M_alloc is decreased to 10, but M_tot is not changed. A little later, the base station 105 schedules 10 PDUs; M_used falls to zero and M_free is now 20. A transfer allowance message is generated carrying M_tot−M_used=20 credits. At the RNC 103, when this is received, the existing 10 credits are overwritten. Later, 20 PDUs are generated at the RNC 103 and are immediately passed to the base station 105. When these are scheduled, a second allocation is sent to the RNC 103. After 2550 ms these credits expire. When 10 new PDUs are generated there are no credits, so a capacity request is generated. In response, the base station 105 grants new credits and the PDUs are forwarded to the base station 105.

Figure 6:
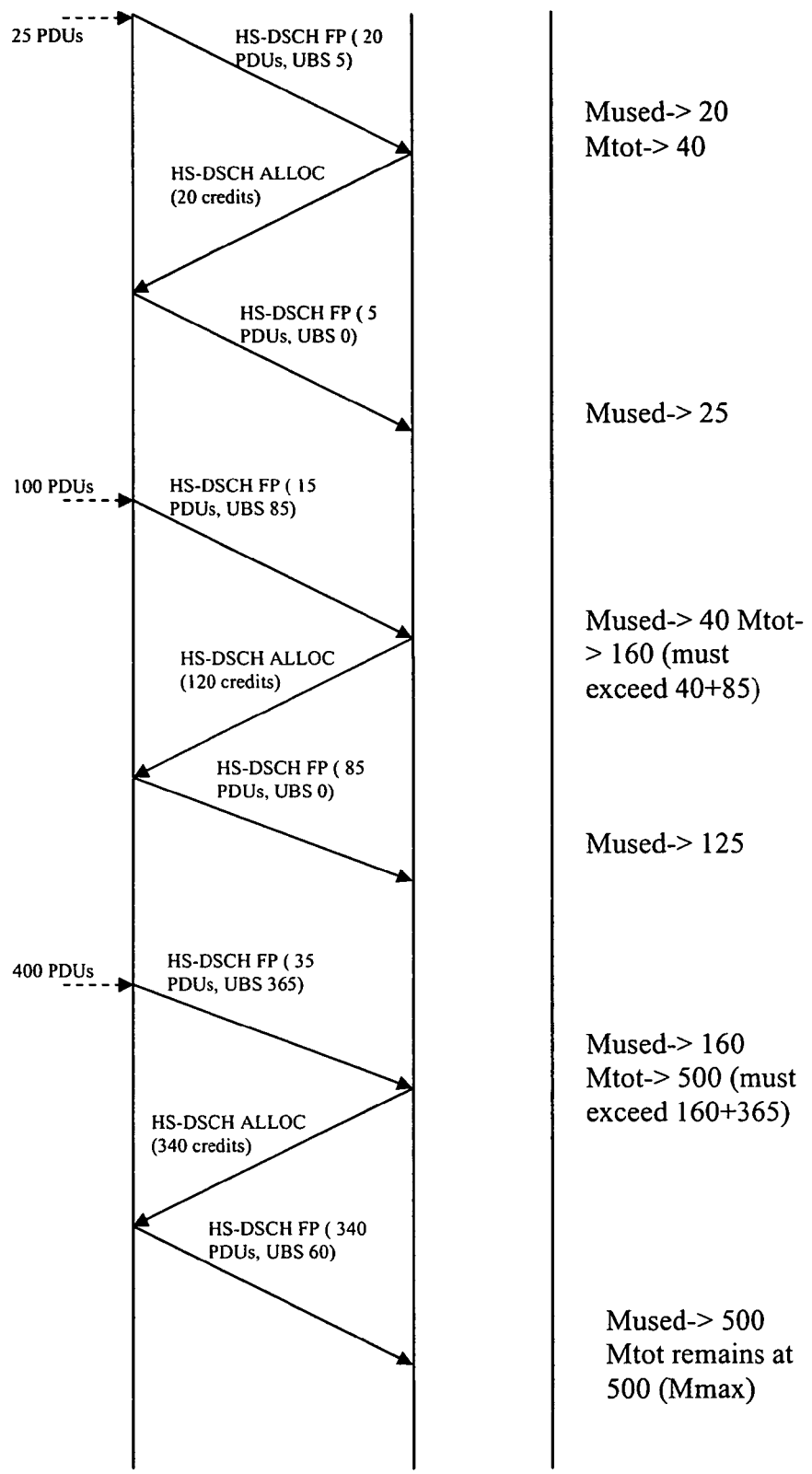
FIG. 6 illustrates an example data and signalling flow in accordance with some embodiments of the invention.

FIG. 6 illustrates another example flow chart in accordance with some embodiments of the invention. In particular, FIG. 6 exemplifies how the first memory allocation M_tot may be increased. In the example, the initial conditions are: M_used=0, M_tot=20, M_free=0, M_alloc=0, and there are 20 credits at the RNC 103.

Figure 7:
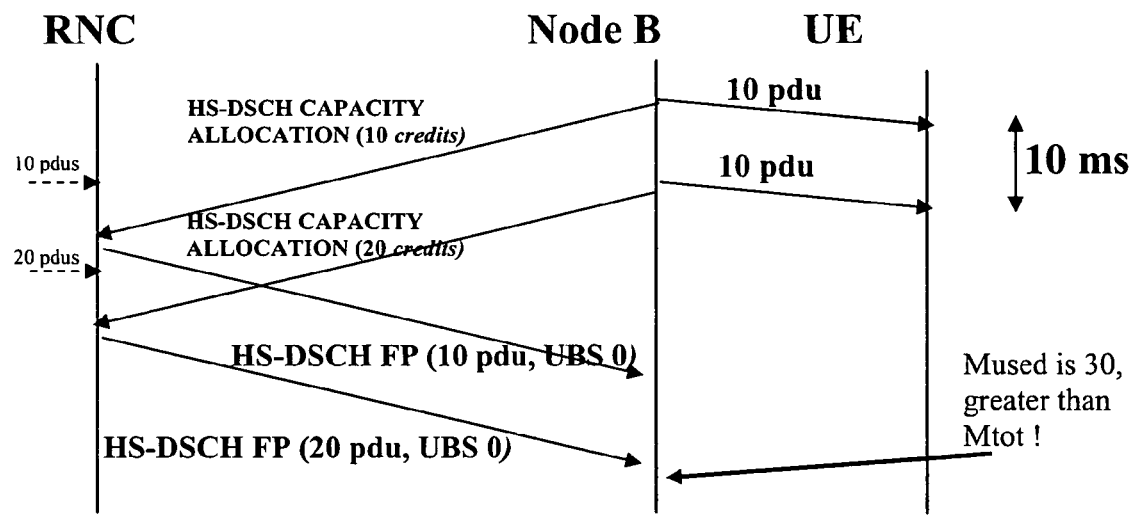
FIG. 7 illustrates an example data and signalling flow in accordance with some embodiments of the invention.

The combination of Iub latency, together with the manner in which credit allocations overwrite previous allocations, may lead to some unexpected effects. For example, it is possible that M_used can overflow M_tot, as illustrated in the example flow of FIG. 7. In this example, the initial conditions are M_used=20, M_tot=20, M_free=0, M_alloc=0, and there are no credits and no PDUs at the RNC. As can be seen, a number of PDUs are transmitted to the base station 105 after a transfer allowance message has been sent from the base station 105 to the RNC 103 but before this is received at the RNC 105. This results in M_used being larger than M_tot. However, the operation of the flow controller 211 will automatically correct for this effect in the subsequent transfer allowances.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

I claim:

1. A base station for a cellular communication system, the base station comprising:
   a receiver for receiving data packets from a Radio Network Controller, RNC;
   a transmitter for transmitting the data packets over air interface channels;
   a buffer memory configured to buffer the data packets by storing the data packets prior to transmission;
   a scheduler for scheduling the data packets for transmission over the air interface channels;
   a memory allocator configured to:
      determine a buffer memory size of the buffer memory;
      receive an RNC buffer usage indication for data packets associated with a first air interface communication;
      determine a current buffer usage, which is an amount of memory of the buffer memory being used, and a buffer memory usage requirement associated with the RNC buffer usage indication;
      determine a first memory allocation, which is an amount of memory of the buffer memory allocated to support the first air interface communication with a first user equipment;
      set a maximum first memory allocation threshold, which is a threshold amount of memory of the buffer memory, dependent upon at least one from a group consisting of:
         a maximum scheduling capacity of the scheduler in one scheduling interval, and
         a latency characteristic of a communication between the RNC and the base station; and
      increase the first memory allocation up to the maximum first memory allocation threshold when a sum of the current buffer usage and a buffer memory usage requirement associated with the RNC buffer usage indication exceeds the first memory allocation;
   a flow controller for determining a transfer allowance for transferring of data from the RNC to the base station based on the buffer memory size, the first memory allocation of the buffer memory and a current buffer memory usage of the first air interface communication; and
   communication logic for transmitting the transfer allowance to the RNC to indicate the amount of data associated with the first air interface communication that may be transmitted from the RNC to the base station.

2. The base station of claim 1, wherein the flow controller is configured to determine the transfer allowance by subtracting the current buffer memory usage from the first memory allocation of the current buffer memory.

3. The base station of claim 1 wherein the flow controller is operable to determine the transfer allowance in response to a scheduling of data packets from the buffer memory by the scheduler.

4. The base station of claim 1 wherein the memory allocator is operable to determine the first memory allocation in response to a transfer allowance request from the RNC.

5. The base station of claim 1 wherein the base station comprises logic for determining the transfer allowance in response to an amount of data packets received from the RNC.

6. The base station of claim 1 wherein the base station comprises logic for determining a free buffer memory amount of the first memory allocation.

7. The base station of claim 6 wherein the logic for determining the free buffer memory amount is operable to determine the free buffer memory amount in response to a scheduling of data packets by the scheduler.

8. The base station of claim 6 wherein the communication logic is operable to transmit the transfer allowance to the RNC only if the free buffer memory amount exceeds a transmission threshold.

9. The base station of claim 8 wherein the transmission threshold is a function of the first memory allocation.

10. The base station of claim 6 wherein a sum of the free buffer memory amount, the allocated transfer allowance and the current buffer memory usage is equal to the first memory allocation.

11. The base station of claim 1 wherein the memory allocator comprises a maximum memory allocation threshold for the first memory allocation.

12. The base station of claim 1 wherein the memory allocator is operable to determine the first memory allocation for a first priority level of the first user equipment.

13. The base station of claim 1 wherein the first priority level is associated with a plurality of air interface channels between the base station and the first user equipment.

14. The base station of claim 1 further comprising means for initialising the first memory allocation to a predetermined value at initialisation of the first air interface communication.

15. The base station of claim 1 further comprising means for initialising the transfer allowance to a predetermined value at initialisation of the first air interface communication.

16. The base station of claim 1 further comprising logic for initialising the current buffer memory usage to a predetermined value at initialisation of the first air interface communication.

17. The base station of claim 1 wherein the transfer allowance is indicative of a number of data packets associated with the first air interface communication that may be transmitted to the base station from the RNC.

18. The base station of claim 1 wherein the memory allocator is further operable to determine a memory allocation of the buffer memory for each of a plurality of air interface communications.

19. The base station of claim 1 further comprising logic for determining an expiration time of a transfer allowance and for transmitting a new transfer allocation to the RNC in response to the expiration time.

20. The base station of claim 1, wherein:
   $M_{tot}$ is the first memory allocation;
   $M_{used}$ is the current buffer usage;
   $M_{free}$ is an amount of memory of the buffer memory which is free and could be allocated;
   $M_{alloc}$ is the transfer allowance; and
   the flow controller maintains the following equality:
   $M_{tot} = M_{used} + M_{free} + M_{alloc}$.

21. The base station of claim 20, wherein $M_{tot}$ is increased up to the maximum first memory allocation threshold by repeatedly doubling $M_{tot}$ until a total number of pending Packet Data Units (PDUs) at the RNC can be stored.

22. The base station of claim 20, wherein, at initialization when a radio link is established:

$$M_{tot} = M_{alloc}; \text{ and}$$

$$M_{used} = M_{free} = 0.$$

23. The base station according to claim 20, wherein the flow controller is configured to calculate $M_{alloc}$ by subtracting $M_{used}$ from $M_{tot}$.

24. The base station according to claim 8, wherein the RNC transmits data to the base station only when the RNC receives a current transfer allowance.

25. A method of flow control for a cellular communication system, the method comprising, at a base station:
   receiving data packets from a Radio Network Controller (RNC);
   transmitting the data packets over air interface channels;
   buffering, in a buffer memory, the data packets prior to transmission;
   scheduling the data packets for transmission over the air interface channels;
   determining a buffer memory size of the buffer memory;
   receiving an RNC buffer usage indication for data packets associated with a first air interface communication;
   determining a current buffer usage, which is an amount of memory of the buffer memory being used, and a buffer memory usage requirement associated with the RNC buffer usage indication;
   determining a first memory allocation, which is an amount of memory of the buffer memory allocated to support the first air interface communication with a first user equipment;
   setting a maximum first memory allocation threshold, which is a threshold amount of memory of the buffer memory, dependent upon at least one from a group consisting of:
      a maximum scheduling capacity of the scheduler in one scheduling interval, and
      a latency characteristic of a communication between the RNC and the base station;
   increasing the first memory allocation up to the maximum first memory allocation threshold when a sum of the current buffer usage and a buffer memory usage requirement associated with the RNC buffer usage indication exceeds the first memory allocation;
   determining a transfer allowance for transferring of data from the RNC to the base station based on the buffer memory size, the first memory allocation of the buffer memory and a current buffer memory usage of the first air interface communication; and
   transmitting the transfer allowance to the RNC to indicate the amount of data associated with the first air interface communication that may be transmitted from the RNC to the base station.

26. The method of claim 25 wherein the transfer allowance is determined as the current buffer memory subtracted from the first memory allocation.

27. The method of claim 26 wherein the transfer allowance is determined in response to a scheduling of data packets from the buffer memory by a scheduler.

28. The method of claim 25 wherein the first memory allocation is determined in response to a transfer allowance request from the RNC.

29. The method of claim 25 wherein the transfer allowance is determined in response to an amount of data packets received from the RNC.

30. The method of claim 25 further comprising determining a free buffer memory amount of the first memory allocation of the buffer memory.

31. The method of claim 30 wherein the free buffer memory amount is determined in response to a scheduling of data packets by the scheduling means.

32. The method of claim 30 wherein the transfer allowance is transmitted to the RNC only if the free buffer memory amount exceeds a transmission threshold.

33. The method of claim 30 wherein a sum of the free buffer memory amount, the allocated transfer allowance and the current buffer memory usage is equal to the first memory allocation.

34. The method of claim 25 wherein the allocation of the first memory allocation is limited by a maximum memory allocation threshold for the first memory allocation.

35. The method of claim 25 wherein the first memory allocation is determined for a first priority level of the first user equipment.

36. The method of claim 32 further comprising:
   receiving data packets for the first communication from the RNC in response to the transfer allowance.

37. A non-transitory computer readable medium including executable program code stored therein for flow control for a cellular communication system, which when executed at a base station performs a process comprising:
   receiving data packets from a Radio Network Controller (RNC);
   transmitting the data packets over air interface channels;
   buffering in a buffer memory the data packets prior to transmission;
   scheduling the data packets for transmission over the air interface channels;
   determining a buffer memory size of the buffer memory;
   receiving an RNC buffer usage indication for data packets associated with a first air interface communication;
   determining a current buffer usage, which is an amount of memory of the buffer memory being used, and a buffer memory usage requirement associated with the RNC buffer usage indication;
   determining a first memory allocation, which is an amount of memory of the buffer memory allocated to support the first air interface communication with a first user equipment;
   setting a maximum first memory allocation threshold, which is a threshold amount of memory of the buffer memory, dependent upon at least one from a group consisting of:
      a maximum scheduling capacity of the scheduler in one scheduling interval, and
      a latency characteristic of a communication between the RNC and the base station;
   increasing the first memory allocation up to the maximum first memory allocation threshold when a sum of the current buffer usage and a buffer memory usage requirement associated with the RNC buffer usage indication exceeds the first memory allocation;
   determining a transfer allowance for transferring of data from the RNC to the base station based on the buffer memory size, the first memory allocation of the buffer memory and a current buffer memory usage of the first air interface communication; and
   transmitting the transfer allowance to the RNC to indicate the amount of data associated with the first air interface communication that may be transmitted from the RNC to the base station.

* * * * *